United States Patent
Louhi

(10) Patent No.: US 6,707,425 B2
(45) Date of Patent: Mar. 16, 2004

(54) METHOD AND SYSTEM FOR ALIGNING A POINT-TO-MULTIPOINT ACCESS TERMINAL

(75) Inventor: Jyrki Tapio Louhi, Espoo (FI)

(73) Assignee: Nokia Corporation (FI)

( * ) Notice: Subject to any disclaimer, the term of this patent is extended or adjusted under 35 U.S.C. 154(b) by 20 days.

(21) Appl. No.: 10/104,992

(22) Filed: Mar. 21, 2002

(65) Prior Publication Data

US 2003/0179135 A1 Sep. 25, 2003

(51) Int. Cl.[7] ................................................ H01Q 3/00
(52) U.S. Cl. ....................................................... 342/359
(58) Field of Search ......................................... 342/359

(56) References Cited

U.S. PATENT DOCUMENTS

| | | | |
|---|---|---|---|
| 2002/0000931 A1 * | 1/2002 | Petronic et al. | 342/359 |
| 2002/0027894 A1 * | 3/2002 | Arrakoski et al. | 370/338 |
| 2002/0158801 A1 * | 10/2002 | Crilly et al. | 342/378 |
| 2003/0080898 A1 * | 5/2003 | Wang et al. | 342/359 |

FOREIGN PATENT DOCUMENTS

GB 2331668 A * 5/1999 ........... H04B/17/00

OTHER PUBLICATIONS

IEEE standard for local and metropolitan area networks—Port–based network access control, IEEE Std 802.1X–2001, 2001.*

"Part 16: Air Interface for Fixed Broadband Wireless Access Systems," *IEEE WirelessMAN 802.16*, Apr. 2, 2002, 350 pages.

* cited by examiner

Primary Examiner—Thomas H. Tarcza
Assistant Examiner—Fred H Mull
(74) *Attorney, Agent, or Firm*—Darby & Darby P.C.; John W. Branch

(57) ABSTRACT

A method and system is directed to aligning a point-to-multipoint access terminal to an access point. The access terminal provides an output signal, including first and second components, to a readout port. Signal strength that is associated with a received signal is encoded in the first component, while the authentication status of the communication link is encoded in the second component. The antenna alignment is adjusted while monitoring the signal strength via the readout port. The antenna is substantially aligned when the signal strength reaches a peak level. In one example, the signal strength is encoded in a DC component of the output signal, while the authentication status is encoded in an AC component of the output signal. The AC component of an AC encoded signal may have a varied amplitude and/or frequency.

37 Claims, 6 Drawing Sheets

US 6,707,425 B2

METHOD AND SYSTEM FOR ALIGNING A POINT-TO-MULTIPOINT ACCESS TERMINAL

FIELD OF THE INVENTION

The present invention is generally directed to point-to-multipoint communication systems. More particularly, the present invention is directed to aligning a communication link between an access terminal and an access point in a point-to-multipoint system.

BACKGROUND OF THE INVENTION

Point-to-multipoint radio access systems (PMP-system) provide wireless access to communication networks. A typical PMP-system includes many base stations that are arranged over a service area. Base stations form the access points to the communication network. Each base station includes an antenna and a transceiver. The transceiver in the base station receives and transmits radio signals via the antenna to link multiple access points to the communication network. The antenna in the base station is typically a sector antenna.

A point-to-multipoint access terminal (hereinafter referred to as an "access terminal") includes a transceiver and a highly directional antenna. The highly directional antenna must be aligned with the base station during the access terminal installation. The highly directional antenna is aligned by adjusting the antenna while reading a DC voltage from the AGC connector in the transceiver. The DC voltage reading is related to the signal strength of a received signal from the antenna at a particular frequency. A service unit is connected to the access terminal to aid in determining an optimal alignment of the antenna. It would be useful to simplify the process of alignment of the antenna in the access terminal.

SUMMARY OF THE INVENTION

The present invention is directed to addressing the above-mentioned shortcomings, disadvantages and problems, and will be understood by reading and studying the following specification.

Briefly stated, a method and system is directed to aligning a point-to-multipoint access terminal to an access point. The access terminal provides an output signal, including first and second components, to a readout port. Signal strength that is associated with a received signal is encoded in the first component, while the authentication status of the communication link is encoded in the second component. The antenna alignment is adjusted while monitoring the signal strength via the readout port. The antenna is substantially aligned when the signal strength reaches a peak level. In one example, the signal strength is encoded in a DC component of the output signal, while the authentication status is encoded in an AC component of the output signal. The AC component of an AC encoded signal may have a varied amplitude and/or frequency.

According to one aspect of the present invention, a method is directed to aligning an antenna in an access terminal with an access point. The method includes receiving a communication signal from the access point to provide a received signal. A signal strength that is associated with the received signal is determined. A first component of an output signal is encoded with the signal strength and provided to a readout port. The antenna position is adjusted to maximize the signal strength. The authentication status that is associated with the received signal is determined. A second component of the output signal is encoded with a status indicator that corresponds to the authentication status. The output signal is provided to the readout port such that the first component of the output signal and the second component of the output signal are provided to the readout port.

According to a further aspect of the present invention, the second component of the output signal is encoded by setting an amplitude of the second component to a first value when the authentication status corresponds to a failed authentication, setting the amplitude of the second component to a second value when the authentication status corresponds to an authentication under process, and setting the amplitude of the second component to a third value when the authentication status corresponds to a verified authentication.

According to still a further aspect of the present invention, the method includes selecting an available receiver frequency, and configuring the access terminal to receive communication signals that are tuned to the selected receiver frequency. The available receiver frequencies may be in a continuous or discrete range of frequencies. Alternatively, the method may include scanning range of available frequencies. The access terminal is tuned to receive communication signals over the scanned frequencies and find a maximum signal strength associated with the scanned frequencies. The frequency that corresponds to the maximum signal strength is selected, and the access terminal is configured to receive communication signals at the selected frequency.

According to a further example of the present invention, a method provides for encoding a DC component of the output signal with the signal strength of the received signal, and encoding an AC component of the output signal with a status indicator. The AC and DC components of the output signal are included in an output signal that is provided to a readout port such as a coaxial connector.

According to another aspect of the present invention, a system is related to aligning an antenna in an access terminal to establish a communication link between the access terminal and an access point. The system includes a receiver, a transmitter, and a controller. The receiver is arranged to receive a receive signal from the antenna, wherein the receive signal corresponds to a signal that is provided by the wireless network over the communication link. The transmitter is arranged to send a transmit signal to the antenna, wherein the transmit signal corresponds to a signal that is provided from a subscriber station to the access terminal. The controller is arranged to determine a signal strength that is associated with the receive signal, determine an authentication status that is associated with the communication link between the access terminal and the access point, and provide an output signal to a readout port in the access terminal. The output signal includes a first component that indicates the signal strength, and a second component that indicates the authentication status of the communication link between the access terminal and the access point.

According to still another aspect of the present invention, a system is related to aligning an antenna in an access terminal to establish a communication link between the access terminal and an access point. The system includes a means for receiving, a means for determining strength, a means for determining status, a means for encoding, and a means for providing signals. The means for determining strength is arranged to determine a signal strength that is associated with the received signal. The means for determining status is arranged to determine an authentication status from the received signal, wherein the authentication status corresponds to a status of the communication link between the access terminal and the access point. The means for encoding is arranged to encode a first component of an output signal with the signal strength and a second component of the output signal with a status indicator that corresponds to the authentication status. The means for providing signals is arranged to provide the output signal to a readout port.

DETAILED DESCRIPTION OF THE PREFERRED EMBODIMENT

Figure 1:
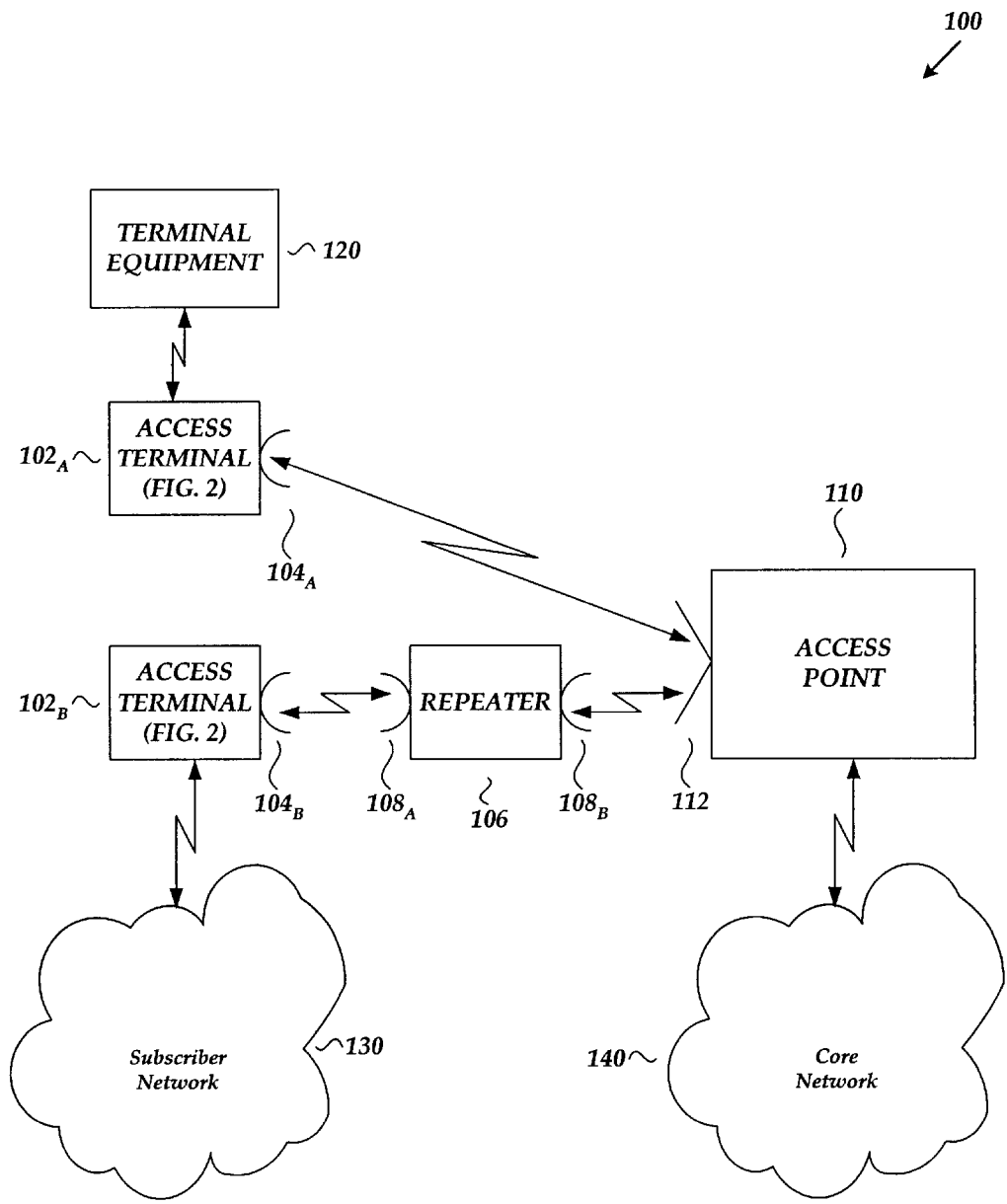
FIG. 1 illustrates an exemplary operating environment in which the invention may operate.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined by the appended claims.

Throughout the specification and claims, the following terms take the meanings explicitly associated herein, unless the context clearly dictates otherwise. The meaning of "a", "an," and "the" include plural references. The meaning of "in" includes "in" and "on." Referring to the drawings, like numbers indicate like parts throughout the views. Additionally, a reference to the singular includes a reference to the plural unless otherwise stated or is inconsistent with the disclosure herein.

The term "user" refers to any person or customer such as a business or organization that employs a wireless network device to communicate or access resources over a network such as a wireless network, a radio access network, a core IP network. The term "operator" refers to any technician or organization that maintains, services, or configures a network. The term "subscriber" refers to any customer of a provider, such as a person or business or organization, which utilizes a wireless device to communicate with a network that is operated by the provider. The term "provider" refers to any person or business organization that provides connection services for one or more subscribers.

The term "wireless device" includes mobile devices such as cellular telephones, smart phones, pagers, radio frequency (RF) devices, infrared (IR) devices, integrated devices combining one or more of the preceding devices, and the like. The term "wireless device" also includes non-mobile devices such radio frequency (RF) devices, microwave devices, millimeter wave devices, access terminals, access points, and the like.

The term "access point" (AP) refers to a relatively stationary wireless device that is arranged to forward/route communications. The term "access terminal" refers to a relatively stationary wireless device that is arranged to forward/route communications between a low-capacity network and an access point (AP). The term "low-capacity network" refers to single data terminals, local area networks, small office home office (SOHO) networks, small and medium enterprise (SME) networks, mobile ad-hoc networks, and the like.

Generally, access terminals may be described as a device that is arranged to act as a gateway. Access terminals may be arranged to operate as the physical interface between terminal equipment (TE) and a core network. Alternatively, access terminals may be arranged to operate as a physical interface between a core network and another network through devices such as a switching/router device. Access terminals communicate through a wireless communication channel to an access point.

The term "router" refers to a dedicated network element that receives IP packets and forwards them to their destination. In particular, a router is used to extend or segment networks by forwarding IP packets from one logical network to another. A router typically operates at layer 3 and below of the Open Systems Interconnection (OSI) reference model for networking. However, some routers can provide additional functionality that operates above layer 3 of the OSI reference model.

Generally, a router is aware of multiple paths that a received IP packet can take to its final destination. Based on the logical address included in a received IP packet, a router will forward the IP packet along an optimal path towards its final destination. Typically, a router contains internal tables of information called routing tables that keep track of all known network addresses and possible paths throughout the internetwork, along with the cost of reaching each logical network. A router optimally routes IP packets based on the available paths and their costs, thus taking advantage of redundant paths that can exist in a mesh topology network. Some routers have static routing tables that must be manually configured with all network addresses and paths in the internetwork. Other routers are capable of automatically/dynamically creating their own routing tables by listening to network traffic.

The term "core network" refers to any network that is maintained by the provider such as a high-speed network that employs ATM or IP protocols. In one example, a core network corresponds to an IP packet based backbone network that includes routers that connect the support nodes in the network. Routers are intermediary devices on a communications network that expedite message delivery. On a single network linking many computers through a mesh of possible connections, a router receives transmitted messages and forwards them to their correct destinations over available routes. Routers may be a simple computing device or a complex computing device. For example, a router may be a computer including memory, processors, and network interface units. Computers, and other related electronic devices may be connected to a core network or a data network. The public Internet itself may be formed from a vast number of interconnected networks, computers, and routers.

The term "communication media" refers to computer-readable media that typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave-guides, and other wired media and wireless media such as acoustic, RF, microwave, millimeter-wave, infrared, and other wireless media. Media that is used in establishing a communication link may also be referred to as communication media or computer-readable media.

The invention provides a method and system for aligning an antenna in an access terminal (AT) such that a communication link is established between the access terminal (AT) and an access point (AP). The access terminal includes an output connector (i.e., AGC). During an installation configuration, an operator connects service equipment to the output connector to align the antenna. A DC signal is provided to the service equipment (i.e., a digital volt meter (DVM)) through the output connector (i.e., a coaxial connector) to indicate the signal strength of the antenna reception in the access terminal. An AC signal is provided to the measurement device through the output connector to indicate a system status. The AC signal may indicate any number of status levels based on the system requirements. The AC signal may be employed to indicate an authentication status that corresponds to the IEEE 802.16 standard, "Air Interface for Fixed Broadband Wireless Access Systems". Alternatively, the DC signal may be arranged to indicate the status level while the AC signal is arranged to indicate the signal strength.

Illustrative Operating Environment

FIG. 1 shows an exemplary operating environment (100) in which the invention operates. Operating environment 100 includes access terminals $102_{A-B}$, repeater 106, access point 110, terminal equipment 120, subscriber network 130, and core network 140.

Access point 110 includes a sector antenna 112. Alternatively, antenna 112 may be an omni-directional antenna. Sector antennas have a radiation pattern that is similar to a slice or sector of a pie chart. A typical sector antenna may have a radiation pattern with a range of 90 degrees, 60-degrees, 45 degrees, 30-degrees, or some other defined operating range. Omni-directional antennas typically have a radiation pattern that encompasses 360 degrees about the antenna. Although sector antennas have a limited range as compared to omni-directional antennas, sector antennas tend to have better overall gain than omni-directional antennas.

Access terminal $102_A$ includes a directional antenna $104_A$. Directional antennas have a very narrow antenna beam width as compared to a sector antenna, and are hence highly directional. A communication link may be established between access terminal $102_A$ and access point 110 when directional antenna $104_A$ is properly aligned with sector antenna 112. Access point 110 is arranged to control the transmission and reception of communication signals between access terminals (i.e., access terminal $104_A$) and core network 140. Terminal equipment 120 may be coupled to core network 140 via access terminal $102_A$.

Repeater 106 may include directional antennas $108_{A-B}$. Access terminal $102_B$ includes directional antenna $104_B$. A communication link may be established between access terminal $102_B$ and access point 112 when directional antenna $104_B$ is aligned to directional antenna $108_A$, and when directional antenna $108_B$ is aligned with sector antenna 112. Access point 110 controls the transmission and reception of communication signals between access terminal $102_B$ and core network 140. Subscriber network 130 is coupled to access terminal $102_B$.

Communication between subscriber network 130 and core network 140 is accomplished via access terminal $102_B$, repeater 106, and access point 110. Access terminal 102B is arranged to act as a gateway type of device that forwards/routes communications between subscriber network 130 and access point 110. Subscriber network 130 may be a low capacity network, as previously described, or another network. In one example, subscriber network 130 includes a hub and/or Ethernet switch/router (i.e., IEEE 802.3, IEEE 802.11 communication protocols) that directs communication traffic between access terminal $102_B$ and end users. In another example, subscriber network 130 includes one or more digital subscriber line (DSL) modem devices.

Access terminals $102_A$–$102_B$ may be arranged to forward/route communication signals that employ the IEEE 802.3 standard, commonly referred to as 10BaseT, 100BaseT, Thick-net, and Thin-net Ethernet standards. For example, access terminal $102_B$ may be arranged to cooperate with subscriber network 130 using 100BaseT with full duplex communications. Access point 110 may also be arranged to forward/route communication signals that employ the IEEE 802.3 protocols. For example, access point 110 may be arranged to cooperate with core network 140 using 1 GbE with full duplex communications. Access point 110 operates as an interface to/from core network 140 and access terminals (i.e., AT $102_A$, AT $102_B$, etc.) Communication links between the access terminals and an access point are established using a wireless protocol such as the Point-to-Multipoint (PMP) air interface defined in the IEEE 802.16 standard, "Air Interface for Fixed Broadband Wireless Access Systems".

Core network 140 may be described as an Internet Protocol (IP) network that provides communication via an Ethernet interface, an Asynchronous Transfer Mode (ATM) interface, an SDH interface, as well as any other appropriate network interface. In one example, core network 140 interfaces with access point 110 via an edge router. In another example, multiple access points are multiplexed together via an access point mutliplexer (AP MUX, not shown), and the AP MUX is coupled to the core network through an edge router. The AP MUX may be implemented as an Ethernet switch, an Ethernet router, or a core network router.

Subscriber network 130 may be described as an Internet Protocol (IP) network that provides communication via an Ethernet interface, an Asynchronous Transfer Mode (ATM) interface, an SDH interface, as well as any other appropriate network interface. In one example, subscriber network 130 interfaces with access terminal $102_B$ via customer provided equipment (CPE) such as an Ethernet switch, a router, or a firewall/router.

Access terminal (AT) $102_A$ is coupled to radio access network 110 through access point (AP) $104_A$. Generally, access terminal $102_A$ is described as a device that is arranged to act as a gateway. Access terminal (AT) $102_A$ may be arranged to operate as the physical interface between terminal equipment (TE) and the radio access network (110). Alternatively, access terminal (AT) $102_A$ may be arranged to operate as a physical interface between the radio access network (110) and another network (not shown) through devices such as a switching/router device (not shown). The access terminal $102_A$ communicates through a wireless communication channel to access point $104_A$.

Exemplary Access Terminal

Figure 2:
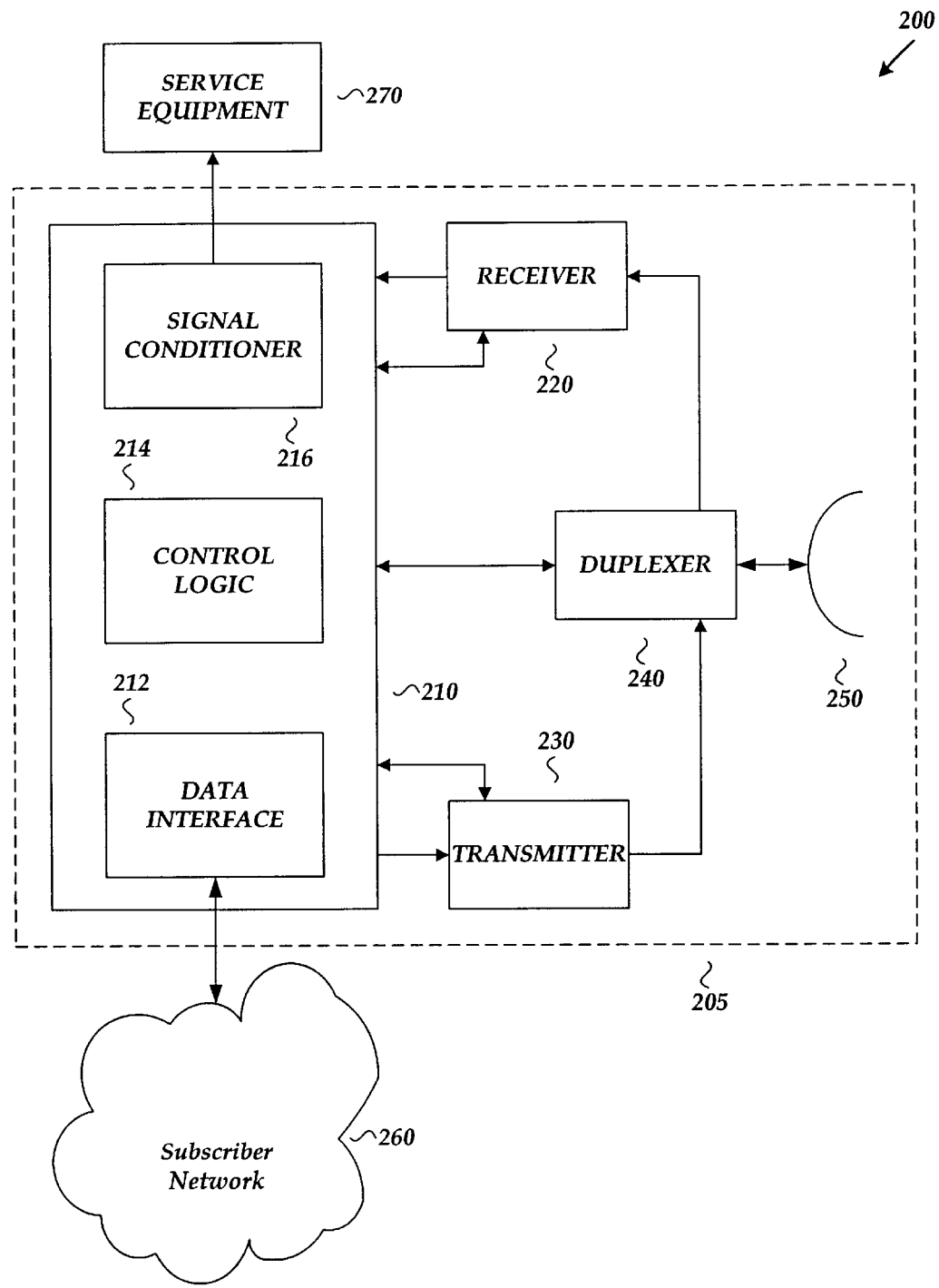
FIG. 2 is a schematic diagram that illustrates an exemplary access terminal and associated interfaces.

FIG. 2 is a schematic diagram (200) that illustrates an exemplary access terminal (205) and associated interfaces in accordance with the present invention. Access terminal 205 includes controller 210, receiver 220, transmitter 230, duplexer 240, and antenna 250. Controller 210 further includes data interface 212, control logic 214, and signal conditioner 216.

Controller 210 has a receive port, a transmit port, a service port, a bi-directional data port, and three bi-directional control ports. Duplexer 220 has a bi-directional port, a bi-directional control port that is coupled to one of the control ports in controller 210, an input signal port, and an output signal port. Antenna 250 has a bi-directional port that is coupled to the bi-directional port of duplexer 220. Receiver 220 has an input port that is coupled to the output signal port of duplexer 240, a bi-directional control port that is coupled to one of the bi-directional control ports in controller 210, and an output port that is coupled to the receive port of controller 210. Transmitter 230 has an input port that is coupled to the transmit port of controller 210, a bi-directional control port that is coupled to one of the bi-directional control ports in controller 210, and an output port that is coupled to the input port of duplexer 240.

Antenna 250 cooperates with duplexer 240 to receive and transmit communication signals in a wireless communication channel. Controller 210 is arranged to provide control signals to receiver 220, transmitter 230, and duplexer 240 via control ports. Duplexer 240 routes transmitted signals from the transmitter to the antenna, and received signals from the antenna to the receiver, in response to one of the control signals from controller 210. Receiver 220 and transmitter 230 are operated under the control of controller 210 via their respective control signals. In one example, receiver 220 and transmitter 230 are tuned to particular frequencies in response to their respective control signals from controller 210. Receiver 220, transmitter 230 and duplexer 240 may also be arranged to communicate with controller 210 through their respective bi-directional control ports. For example, the various control signals may be employed to provide status reporting to controller 210.

Controller 210 employs control logic 214 to selectively control the reception and transmission of signals between subscriber network 260 or terminal equipment (not shown) and antenna 250. Controller 210 includes data interface 212, which is arranged to translate/format data signals between subscriber network 260 and wireless communication signal formats (i.e., IEEE 802.16 protocols). Controller 210 also includes signal conditioner 216, which is arranged to provide output signals that are utilized by service equipment 270.

Antenna 250 is a directional antenna. The directional antenna must be aligned to an access point during an installation procedure. Controller 210 includes a readout port. Service equipment 270 is utilized in the installation and/or configuration of access terminal 205. During the configuration of access terminal 205, service equipment 270 is coupled to the readout port. The signal strength of each received communication signal is encoded in a first component of the output signal, and provided to the readout port. Service equipment 270 receives the first component of the output signal to monitor the received signal. In one example, the first component of the output signal is a DC component, where the DC level corresponds to the received signal strength. In another example, the first component of the output signal is an AC component, where the amplitude (or the frequency) of the AC component corresponds to the received signal strength. As the antenna alignment is adjusted, the signal strength of the received signal will vary. Antenna 250 is properly aligned with an access point when the signal strength of the received communication signal reaches a peak level.

Authentication procedures are employed by access terminal 205 to ensure a secure communication link between the access terminal and the access point. Control logic 214 is arranged to verify proper authentication in accordance with the requirements for the wireless communication system (i.e., IEEE 802.16 authentication). An unauthorized inbound communication signal is denied access to subscriber networks (i.e., subscriber network 260). Signal conditioner 216 is arranged to translate the authentication status of the communication link to a code that is useable by service equipment 270.

Signal conditioner 216 provides a second component of the output signal to the readout port, indicating the status of authentication. The authentication status of the communication link is encoded in the second component of the output signal. The signal conditioner may include a digital-to-analog converter (DAC) that is configured to generate the output signal. For example, the second component of the output signal may correspond to a fixed frequency AC signal with a varied signal level (amplitude) that is provided to the readout port. For this first example, the signal level of the AC signal indicates the authentication status of the communication link. In another example, a fixed level (amplitude) AC signal with a varied frequency is provided to the readout port. For this second example, the frequency of the AC signal indicates the authentication status of the communication link. In still another example, a DC signal is provided to the readout port, where the level of the DC signal indicates the authentication status of the communication link.

The first and second components of the output signal (i.e., an AC and DC component of the output signal) are simultaneously provided to the readout port. In one example, the first component is encoded in a DC signal, while the second component is encoded in an AC signal. In another example, the first component is encoded in an AC signal, while the second component is encoded in a DC signal. In still another example, the first and second components are encoded in AC signals, using frequency and amplitude to communicate information.

Service equipment 270 (i.e., a multi-meter) is utilized to read the first and second components of the output signal. The first component of the output signal indicates the signal strength of the received signal, while the second component of the output signal indicates the authentication status of the communication link. Example authentication status indicators include authentication under process (AUP), authentication failed (AF), authentication ok (AOK), as well as others.

Access terminals transmit and receive signals over a communication channel to establish a communication link with an access point. During configuration, an operator connects the service equipment to the access terminal. The service equipment employed may be standard test equipment such as a multi-meter, an analog voltmeter with AC and/or DC readouts, a digital voltmeter with AC and/or DC readouts, a frequency counter, and the like. The operator selects the appropriate operating mode in the service equipment for monitoring the first and second components of the output signal. The operator monitors readouts from the service equipment to determine proper alignment and authentication. Since the authentication process is verified using a simple measurement device, the cost and time required to configure the access terminal is low.

The operator selects an appropriate mode for the service equipment to determine the signal strength of received communication signals from the first component of the output signal. After the readout indicates that the signal strength exceeds a predetermined threshold, the signal level is sufficient to establish a communication link between the access point and the access terminal. Receiver 220 cooperates with antenna 250 to receive communication signals that are transmitted over the communication channel at a specified receiver frequency. Transmitter 230 cooperates with antenna 250 to transmit communication signals over the communication channel at a specified transmitter frequency.

In one exemplary embodiment, the transmitter and receiver frequencies are the same. In another exemplary embodiment, the transmitter and receiver frequencies are different from one another. In one example, receiver 220 and controller 210 are arranged to cooperate with one another such that the receiver frequency can be dynamically changed (i.e., scanning for an available communication channel). Similarly, transmitter 230 and controller 210 may be arranged to cooperate with one another such the transmit frequency can be dynamically changed.

After the signal strength (as indicated by the first component) is adequate for proper communication, the operator selects the appropriate mode (i.e., AC, DC, frequency, etc.) for the service equipment to monitor the authentication status. The operator monitors the readout of the service equipment to determine the authentication status as previously described.

First Exemplary Procedural Flow

Figure 3A:
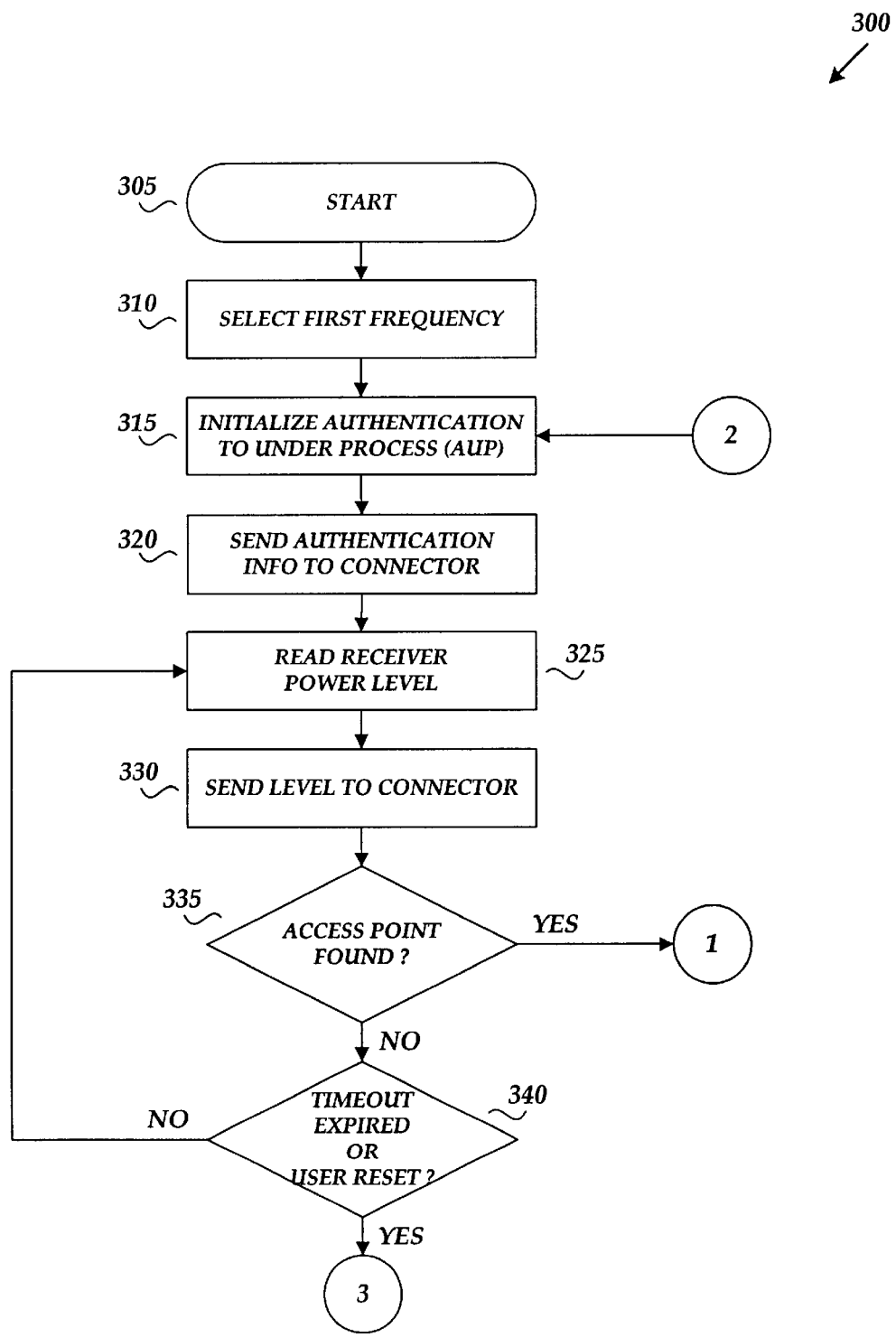
FIG. 3A is a flow chart that illustrates a portion of a first procedure that may be used in an exemplary access terminal.
Figure 3B:
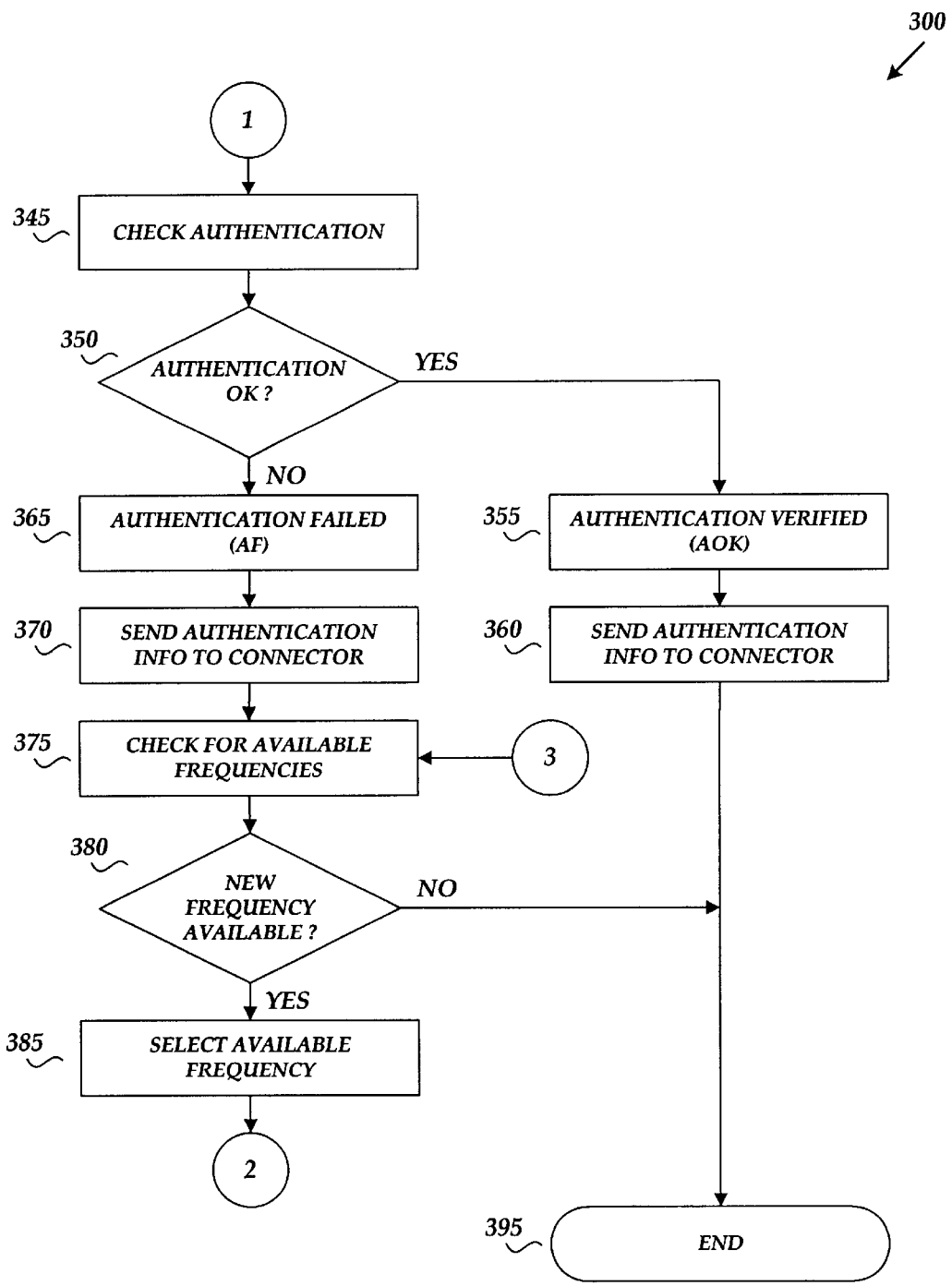
FIG. 3B is a flow chart that illustrates another portion of a first procedure that may be used in an exemplary access terminal.

FIG. 3A is a flow chart that illustrates a portion of a first procedure that may be used in an exemplary access terminal. FIG. 3B is a flow chart that illustrates another portion of the first procedure that may be used in an exemplary access terminal. Moving from start block 305 (See FIG. 3A), the process advances to block 310 where the receiver frequency is initialized to a first frequency. In one example, an operator manually selects the receiver frequency. In another example, the controller in the access terminal automatically selects the receiver frequency. Other means for selecting the receiver frequency are possible.

Processing flows from block 310 to block 315, authentication status in the access terminal (i.e., in the controller) is initialized to authentication under process (AUP). Processing continues from block 315 to block 320, where the access terminal sends authentication information to the readout connector (or readout port). Continuing to block 325, the access terminal reads the receiver power level. Processing flows from block 325 to block 330, where the access terminal sends the receiver power level reading to the readout connector (or readout port). The access terminal (i.e., AT 205 in FIG. 2) may provide the receiver power level to the readout port in the form of a DC signal, as previously discussed with respect to FIG. 2. Alternatively, the access terminal may be arranged to provide the receiver power level to the readout port in the form of an AC signal.

Continuing to decision block 335, the receiver power level is analyzed to determine when an access point is found. Processing flows from decision block 335 to decision block 340 when the access point is not found. Otherwise, processing continues from decision block 335 to block 345 (see FIG. 3B). An access point is identified as found when the receiver power level exceeds a predetermined amount. An operator may adjust the alignment of the antenna until the receiver power level exceeds the predetermined amount. Alternatively, an automatic alignment system may adjust the position of the antenna until the receiver power level exceeds the predetermined amount.

Blocks 325 through 340 form a processing loop. Decision block 340 is provided to ensure the processing loop terminates. At decision block 340, the access terminal checks for a timeout condition or a user initiated reset condition. The access terminal may be configured to terminate the processing loop after a predetermined timeout condition expires (TIMEOUT EXPIRED). Alternatively, a user initiated reset (USER RESET) may be initiated to break the processing loop. Processing flows from decision block 340 to block 325 when the timeout has not expired and the user reset has not been initiated. Processing flows from decision block 340 to block 375 (see FIG. 3B) when the timeout expires, or when the user reset is initiated.

At block 345, the authentication of the communication link is verified. In one example, the operator manually checks the authentication status by monitoring the AC signal from the readout port with the service equipment. In an alternative example, the operator manually checks the authentication status by monitoring the DC signal from the readout port with the service equipment. In another example, the service equipment automatically monitors the signal at the readout port. The controller in the access terminal analyzes the received signal to verify the authentication. Processing continues from block 345 to decision block 350, where the controller in the access terminal analyzes the authentication status. The controller may be configured to verify authentication in accordance with the IEEE 802.16 wireless communication standard.

Processing flows from decision block 350 to block 355 when the controller determines that the authentication is verified (AOK). Otherwise, processing flows from decision block 350 to block 365 when the controller determines that the authentication has failed (AF). At block 355, the controller initializes the signal conditioner to provide a signal (i.e., an AC signal) to indicate that authentication is verified (AOK). Processing continues from block 355 to block 360, where the access terminal sends authentication information to the readout connector (or readout port). From block 360, processing flows to block 395 where processing terminated. Returning to block 365, the controller initializes the signal conditioner to provide a signal (i.e., an AC signal) to indicate that authentication has failed (AF). Processing continues from block 365 to block 370, where the access terminal sends authentication information to the readout connector (or readout port).

As previously stated with respect to FIG. 2, the authentication status is encoded in the AC signal that is provided to the readout port (or connector terminal such as a coaxial connector). In one example, the authentication status is determined to be verified (AOK) when the AC signal level exceeds a first predetermined level (i.e., 1V AC), the authentication status is determined to be under process (AUP) when the AC signal level is between (i.e., 0.5V AC) the first predetermined level (i.e., 1V AC) and a second predetermined level (i.e. 0V AC), and the authentication status determined to be failed (AF) when the AC signal level is at or below the second predetermined level (i.e., 0V AC). Other signal-level ranges may also be employed to indicate other states of authentication status as may be desired. In another example, the AC signal may be frequency encoded to indicate the authentication status. In an alternative example, the DC signal may be arranged to indicate the status level while the AC signal is arranged to indicate the signal strength.

Processing continues from block 370 to block 375, where the availability of additional frequencies is checked. Next, processing continues to decision block 380, where the availability of additional receiver frequencies is analyzed. Processing flows from decision block 380 to block 385 when it is determined that additional receiver frequencies are available. Otherwise, processing flows from decision block 380 to block 395 where processing is terminated when no additional receiver frequencies are available. At block 385, one of the available receiver frequencies is selected. Processing continues from block 385 to block 315.

Second Exemplary Procedural Flow

Figure 4A:
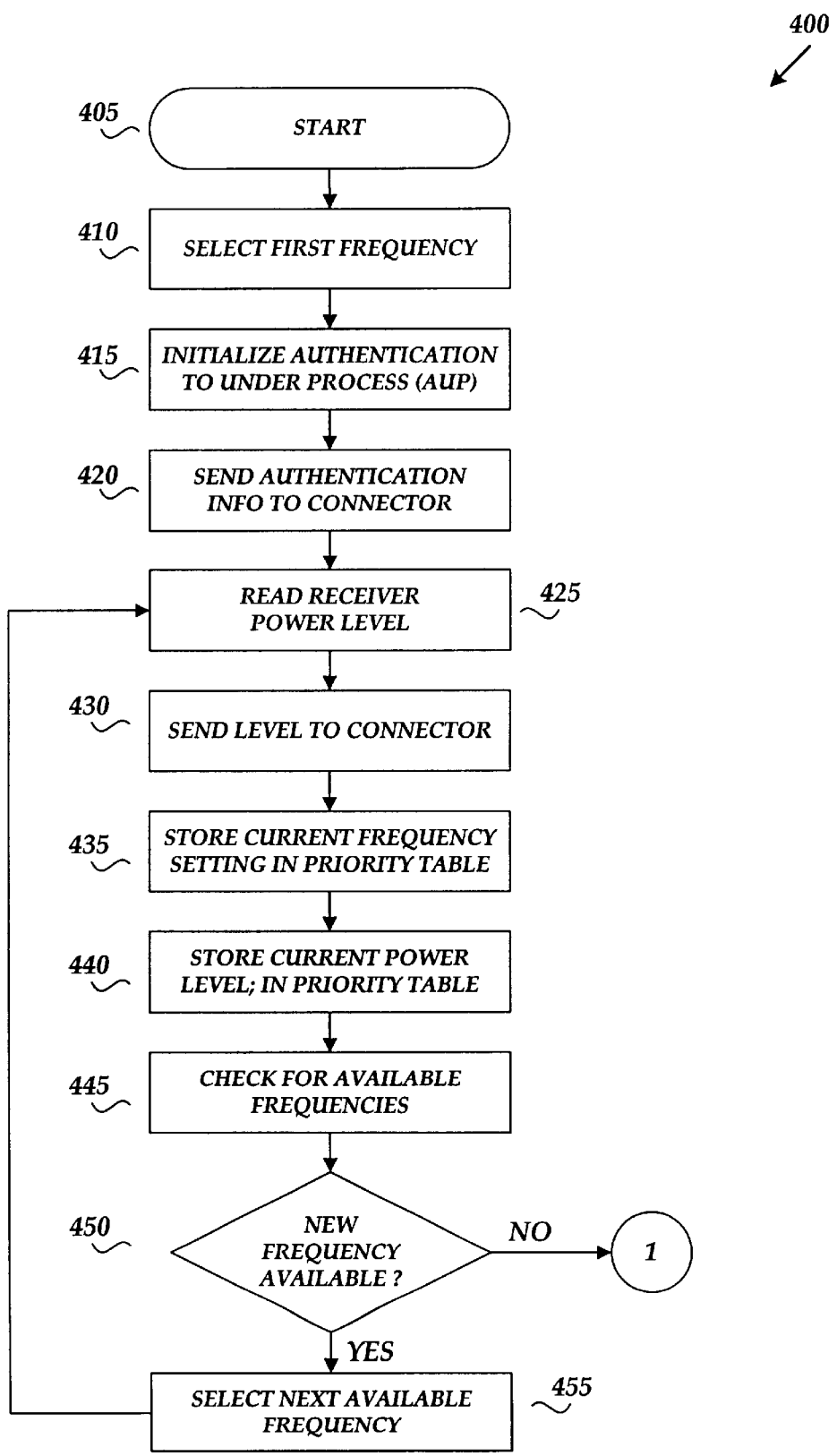
FIG. 4A is a flow chart that illustrates a portion of a second procedure that may be used in an exemplary access terminal.
Figure 4B:
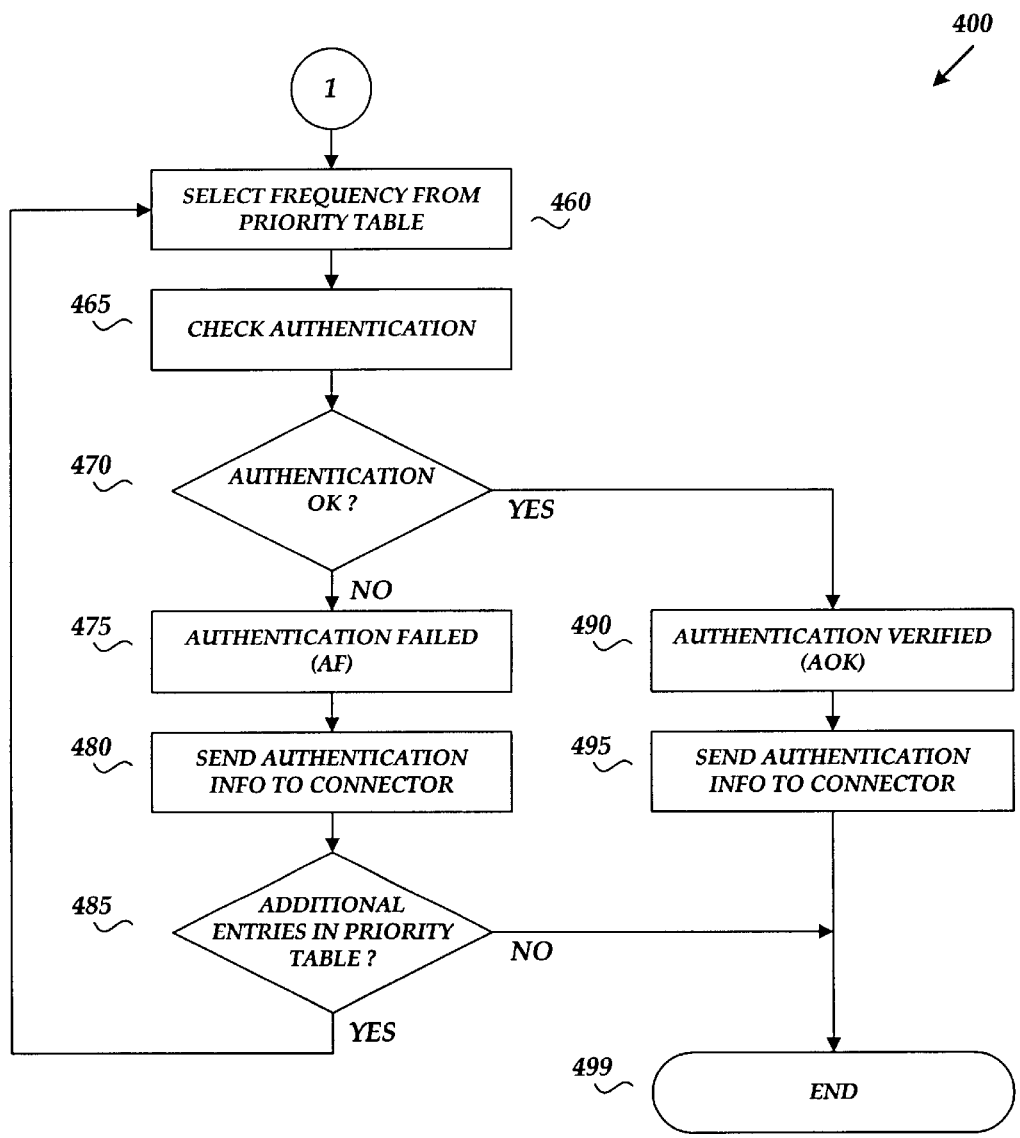
FIG. 4B is a flow chart that illustrates another portion of the second procedure that may be used in an exemplary access terminal, in accordance with the present invention.

FIG. 4A is a flow chart that illustrates a portion of a second procedure that may be used in an exemplary access terminal. FIG. 4B is a flow chart that illustrates another portion of the second procedure that may be used in an exemplary access terminal. Moving from start block 405 (See FIG. 4A), the process advances to block 410 where the receiver frequency is initialized to a first frequency. In one example, an operator manually selects the receiver frequency. In another example, the controller in the access terminal automatically selects the receiver frequency. Other means for selecting the receiver frequency are possible.

Processing flows from block 410 to block 415, authentication status in the access terminal (i.e., in the controller) is initialized to authentication under process (AUP). Processing continues from block 415 to block 420, where the access terminal sends authentication information to the readout connector (or readout port). Continuing to block 425, the access terminal reads the receiver power level. Processing flows from block 425 to block 430, where the access terminal sends the receiver power level reading to the readout connector (or readout port). The access terminal (i.e., AT 205 in FIG. 2) may provide the receiver power level to the readout port in the form of a DC signal, as previously discussed with respect to FIG. 2. Alternatively, the access terminal may be arranged to provide the receiver power level to the readout port in the form of an AC signal that is encoded. The AC signal may be encoded signal with amplitude or frequency.

Processing continues from block 430 to block 435, where the current frequency setting is stored in a priority table. Processing continues from block 430 to block 435 where the current power level that is associated with the current frequency setting is stored in the priority table. Processing continues from block 440 to block 445, where the access terminal checks for additional available frequencies. Next, processing continues to decision block 450, where the availability of additional receiver frequencies is analyzed. Processing flows from decision block 450 to block 455 when it is determined that additional receiver frequencies are available. Otherwise, processing flows from decision block 450 to block 460 (See FIG. 4B). At block 455 one of the available receiver frequencies is selected. Processing continues from block 455 to block 425.

Blocks 425 through 455 form a processing loop that is arranged to scan all of the available frequencies and read the power levels associated with each frequency. The processing loop for scanning available frequencies flows from decision block 450 to block 460, when all of the available frequencies are scanned. After all of the frequencies are scanned, the priority table includes an entry for each of the available frequencies and their associated power levels. The priority table may be organized as an unsorted list, or as a sorted list that is arranged in either ascending or descending order.

In one example, the priority table is organized such that the frequency settings and their associated power levels are in an ascending order based on the power level, where the lowest power level corresponds to the first frequency entry and the highest power level corresponds to the last entry in the priority table. In another example, the priority table is organized such that the frequency settings and their associated power levels are in a descending order based on the power level, where the highest power level corresponds to the first frequency entry and the lowest power level corresponds to the last entry in the priority table. Other priorities orders are also possible, such as ascending or descending frequencies, or some other criteria as may be desired.

At block 460, a previously stored frequency is retrieved from the priority table. In one example, the first entry in the priority table corresponds to a scanned frequency at which a maximum power level was identified. Processing continues from block 460 to block 465, where the authentication status of the communication link is verified. In another example, the operator manually checks the authentication status by monitoring the AC signal from the readout port with service equipment. In an alternative example, the operator manually checks the authentication status by monitoring the DC signal from the readout port with the service equipment. In still another example, the service equipment automatically monitors the signal at the readout port for a component of the signal (i.e., an AC frequency, an AC amplitude, or a DC level). The controller in the access terminal analyzes the received signal to verify the authentication. Processing continues from block 465 to decision block 470, where the controller in the access terminal analyzes the authentication status. The controller may be configured to verify authentication in accordance with the IEEE 802.16 wireless communication standard.

Processing flows from decision block 470 to block 490 when the controller determines that the authentication is verified. Otherwise, processing flows from decision block 470 to block 475 when the controller determines that the authentication has failed. At block 490, the controller initializes the signal conditioner to provide a signal (i.e., an AC signal) to indicate that authentication is verified (AOK). Processing continues from block 490 to block 495, where the access terminal sends authentication information to the readout connector (or readout port). Continuing from block 495 to block 499, processing is terminated since authentication has been achieved. Returning to block 475, the controller initializes the signal conditioner to provide a signal (i.e., an AC signal) to indicate that authentication has failed (AF). Processing continues from block 475 to block 480, where the access terminal sends authentication information to the readout connector (or readout port).

From block 480, processing continues at decision block 485, where the priority table is examined. Processing continues from block 485 to block 460 when additional entries are found in the priority table that have not attempted authentication. Otherwise, processing continues from block 485 to block 499, where processing terminates when all of the frequencies in the priority table have unsuccessfully attempted authentication. At block 460, a frequency that has not been used to check authentication is selected from the priority table.

Blocks 460 through 485 are arranged as a processing loop that iterates through all of the frequency settings found in the priority table. The processing loop terminates either when all of the frequencies have been attempted without achieving a valid authentication (authentication failed), or when authentication has successfully been verified. As discussed previously, the priority table may be organized as an unsorted list, or a sorted list that is arranged in either ascending or descending order.

As previously stated with respect to FIGS. 2, 3A, and 3B, the authentication status may be encoded in the AC signal that is provided to the readout port (or connector terminal such as a coaxial connector). For example, the authentication status is determined to be verified (AOK) when the AC signal level exceeds a first predetermined level (i.e., 1V AC), the authentication status is determined to be under process (AUP) when the AC signal level is between (i.e., 0.5V AC) the first predetermined level (i.e., 1V AC) and a second predetermined level (i.e. 0V AC), and the authentication status determined to be failed (AF) when the AC signal level is at or below the second predetermined level (i.e., 0V AC). Other signal-level ranges may also be employed to indicate other states of authentication status as may be desired. In another example, the AC signal may be frequency encoded to indicate the authentication status. In an alternative example, the DC signal may be arranged to indicate the status level while the AC signal is arranged to indicate the signal strength.

As described above, the access terminal will attempt to establish communications when the received signal level indicates that the access point is sufficiently aligned with the access terminal to attempt authentication. The access terminal will search for a free communication slot, to send messages to the access point. The communication slot typically may correspond to a time slot such as in a time division multiplexed (TDM) communication system. The access terminal will send a message (i.e., "here I am") to the access point via the communication slot to indicate that the access terminal is active. The message includes some form of id code (i.e., a unique alphanumeric code) that indicates the identity of the access terminal. The access point will verify that the id code associated with the access terminal has permission to establish a communication link with (i.e., logging into) the access point. The access point sends a response message (i.e., "authentication ok", or "authentication failed") to the access terminal to indicate that the authorization has been granted or denied.

As discussed previously the selection of receiver frequencies may be accomplished by any desired means, including but not limited to manual selection of the receiver frequency by the operator, and automatic selection of the receiver frequency by the controller. For example, the availability of receiver frequencies as in blocks 455 and 460 (See FIG. 4A) may checked and analyzed by any desired means for determining the availability of additional receiver frequencies, including but not limited to manually checking the available receiver frequencies by an operator, and automatically checking the availability of receiver frequencies by the controller in the access terminal.

In one example, the controller may include an internal table or list of available frequencies that is programmed into a memory or fuse type device (i.e., ROM, EPROM, EEPROM, RAM, PAL, PLD, fuse links, hard wired logic, etc.). The table or list of available frequencies may be initialized by an operator or in a production facility. Alternatively, the access terminal may be configured to operate over a band of frequencies (i.e., a continuous range of frequencies) that may be initialized or programmed by an operator or in a production facility. The controller may be arranged to automatically cycle through the available frequencies either discretely, or by sweeping through the available frequencies.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A method for aligning an antenna in an access terminal with an access point, comprising:

receiving a communication signal from the access point to provide a received signal;

determining a signal strength that is associated with the received signal;

encoding a first component of an output signal with the signal strength;

adjusting a position of the antenna to maximize the signal strength;

determining an authentication status that is associated with the received signal;

encoding a second component of the output signal with a status indicator that corresponds to the authentication status; and providing the output signal to the readout port such that the first component of the output signal and the second component of the output signal are provided to the readout port.

2. A method as in claim 1, the step of encoding a first component of the output signal further comprising encoding a DC component of the output signal with the signal strength such that the DC component of the output signal is related to the signal strength.

3. A method as in claim 1, the step of encoding a first component of the output signal further comprising encoding an AC component of the output signal with the signal strength such that the AC component of the output signal is related to the signal strength.

4. A method as in claim 1, the step of encoding a first component of the output signal further comprising encoding an AC component of the output signal with the signal strength such that an amplitude associated with the AC component of the output signal is related to the signal strength.

5. A method as in claim 1, the step of encoding a first component of the output signal further comprising encoding an AC component of the output signal with the signal strength such that a frequency associated with the AC component of the output signal is related to the signal strength.

6. A method as in claim 1, the step of encoding a second component of the output signal further comprising encoding a DC component of the output signal with the status indicator such that the DC component of the output signal is related to the authentication status that is associated with the received signal.

7. A method as in claim 1, the step of encoding a second component of the output signal further comprising encoding an AC component of the output signal with the status indicator such that the AC component of the output signal is related to the authentication status that is associated with the received signal.

8. A method as in claim 1, the step of encoding a second component of the output signal further comprising encoding an AC component of the output signal with the status indicator such that a frequency associated with the AC component of the output signal is related to the authentication status that is associated with the received signal.

9. A method as in claim 1, the step of encoding a second component of the output signal further comprising encoding an AC component of the output signal with the status indicator such that an amplitude associated with the AC component of the output signal is related to the authentication status that is associated with the received signal.

10. A method as in claim 1, the step of encoding a first component of the output signal further comprising encoding a DC component of the output signal with the signal strength, and the step of encoding the second component of the output signal further comprising encoding an AC component of the output signal with the status indicator such that the DC component of the output signal is related to the signal strength and the AC component of the output signal is related to the authentication status that is associated with the received signal.

11. A method as in claim 1, the step of encoding a first component of the output signal further comprising encoding an AC component of the output signal with the signal strength, and the step of encoding the second component of the output signal further comprising encoding a DC component of the output signal with the status indicator such that the AC component of the output signal is related to the signal strength and the DC component of the output signal is related to the authentication status that is associated with the received signal.

12. A method as in claim 1, the step of encoding a first component of the output signal further comprising encoding an amplitude of an AC component of the output signal with the signal strength, and the step of encoding the second component of the output signal further comprising encoding a frequency of the AC component of the output signal with the status indicator.

13. A method as in claim 1, the step of encoding a first component of the output signal further comprising encoding a frequency of an AC component of the output signal with the signal strength, and the step of encoding the second component of the output signal further comprising encoding an amplitude of the AC component of the output signal with the status indicator.

14. A method as in claim 1, the step of encoding the second component of the output signal further comprising:
setting an amplitude of the second component to a first value when the authentication status corresponds to a failed authentication;
setting the amplitude of the second component to a second value when the authentication status corresponds to an authentication under process; and
setting the amplitude of the second component to a third value when the authentication status corresponds to a verified authentication.

15. A method as in claim 1, further comprising:
coupling service equipment to the readout port; and
analyzing the first and second components of the output signal with the service equipment.

16. A method as in claim 15, wherein the service equipment corresponds to at least one of an analog multi-meter, a digital multi-meter, a DC voltmeter, an AC voltmeter, and a frequency counter.

17. A method as in claim 1, further comprising initializing the status indicator to AUP when the authentication status indicates that the authentication of the access terminal is under process.

18. A method as in claim 1, further comprising initializing the status indicator to AOK when the authentication status indicates that the authentication of the access terminal has been verified.

19. A method as in claim 1, further comprising initializing the status indicator to AF when the authentication status indicates that the authentication of the access terminal has failed verification.

20. A method as in claim 1, further comprising:
selecting an available receiver frequency; and
configuring the access terminal to receive communication signals that are tuned to the selected receiver frequency.

21. A method as in claim 20, further comprising selecting another available receiver frequency when the authentication status indicates that the authentication of the access terminal has failed verification.

22. A method as in claim 20, the step of selecting a receiver frequency further comprising selecting a receiver frequency from a continuous range of available frequencies.

23. A method as in claim 1, the step of selecting a receiver frequency further comprising selecting a receiver frequency from a discrete range of available frequencies.

24. A method as in claim 1, further comprising:
scanning a range of available frequencies;
configuring the access terminal to receive a communication signal that is tuned to the receiver frequency for each scanned frequency;
finding a maximum signal strength for the scanned frequencies; and
selecting a receiver frequency that corresponds to the maximum signal strength; and
configuring the access terminal to receive communication signals that are tuned to the selected receiver frequency.

25. A method as in claim 24, the step of scanning a range of available frequencies further comprising scanning a continuous range of available frequencies.

26. A method as in claim 25, the step of scanning a range of available frequencies further comprising scanning a discrete range of available frequencies.

27. A method as in claim 1, wherein the readout port corresponds to a single port such that the first and second components of the output signal are provided to the single port.

28. A method as in claim 1, wherein the readout port corresponds to a single coaxial port such that the first and second components of the output signal are provided to the single coaxial port.

29. A system for aligning an antenna in an access terminal to establish a communication link between the access terminal and an access point in a wireless network, comprising:
a receiver that is arranged to receive a receive signal from the antenna, wherein the receive signal corresponds to a signal that is provided by the wireless network over the communication link;
a transmitter that is arranged to send a transmit signal to the antenna, wherein the transmit signal corresponds to a signal that is provided from a subscriber station to the access terminal; and
a controller that is arranged to determine a signal strength that is associated with the receive signal, determine an authentication status that is associated with the communication link between the access terminal and the access point, and provide an output signal to a readout port in the access terminal, wherein the output signal includes a first component that indicates the signal strength, and a second component that indicates the authentication status of the communication link between the access terminal and the access point.

30. A system as in claim 29, further comprising service equipment that is coupled to the readout port, wherein the service equipment is arranged to monitor the first component of the output signal while a position associated with the antenna is changed to maximize the signal strength, and wherein the service equipment is arranged to monitor the second component of the output signal to verify the authentication status of the communication link.

31. A system as in claim 29, the controller further comprising a signal conditioner that is arranged to provide the first and second components of the output signal, and a control logic that cooperates with the signal conditioner to adjust the first component of the output signal in response to the signal strength, and wherein the control logic cooperates with the signal conditioner to adjust the second component of the output signal in response to the authentication status.

32. A system as in claim 31, the signal conditioner further comprising a digital-to-analog converter that is arranged to provide the first and second components of the output signal.

33. A system as in claim 29, wherein the readout port corresponds to a single port such that the first and second components of the output signal are provided to the single port.

34. A system as in claim 29, wherein the readout port corresponds to a single coaxial port such that the first and second components of the output signal are provided to the single coaxial port.

35. A system for aligning an antenna in an access terminal to establish a communication link between the access terminal and an access point in a wireless network, comprising:

a means for receiving that is arranged to receive a receive signal from the antenna, wherein the receive signal corresponds to a signal that is provided by the wireless network over the communication link;

a means for determining strength that is arranged to determine a signal strength that is associated with the received signal;

a means for determining status that is arranged to determine an authentication status from the received signal, wherein the authentication status corresponds to a status of the communication link between the access terminal and the access point;

a means for encoding that is arranged to encode a first component of an output signal with the signal strength and also encode a second component of the output signal with a status indicator that corresponds to the authentication status; and a means for providing signals that is arranged to provide the first and second components of the output signal to a readout port.

36. A system as in claim 35, further comprising:

a means for monitoring that is arranged to monitor the first component of the output signal; and a means for aligning that is arranged to align the antenna with the access point such that the communication link between the access terminal and the access point is established when the means for monitoring indicates that the first component of the output signal has exceeded a predetermined value.

37. A system as in claim 35, further comprising:

a means for monitoring that is arranged to monitor the second component of the output signal; and a means for adjusting frequency that is arranged to adjust a frequency that is associated with the communication link when the means for monitoring indicates that the status of the communication link corresponds to a failed verification.

* * * * *